Figure 1:
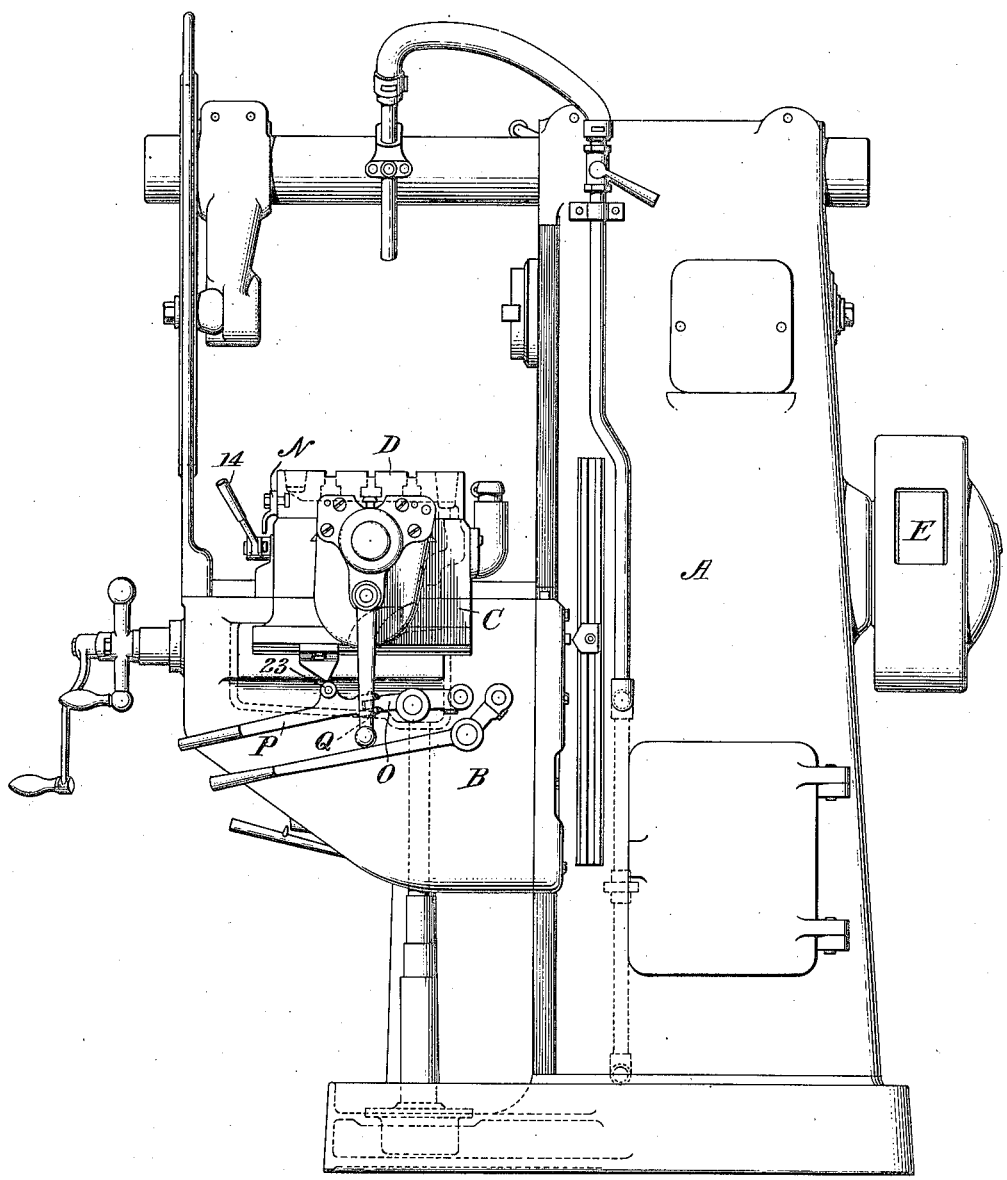

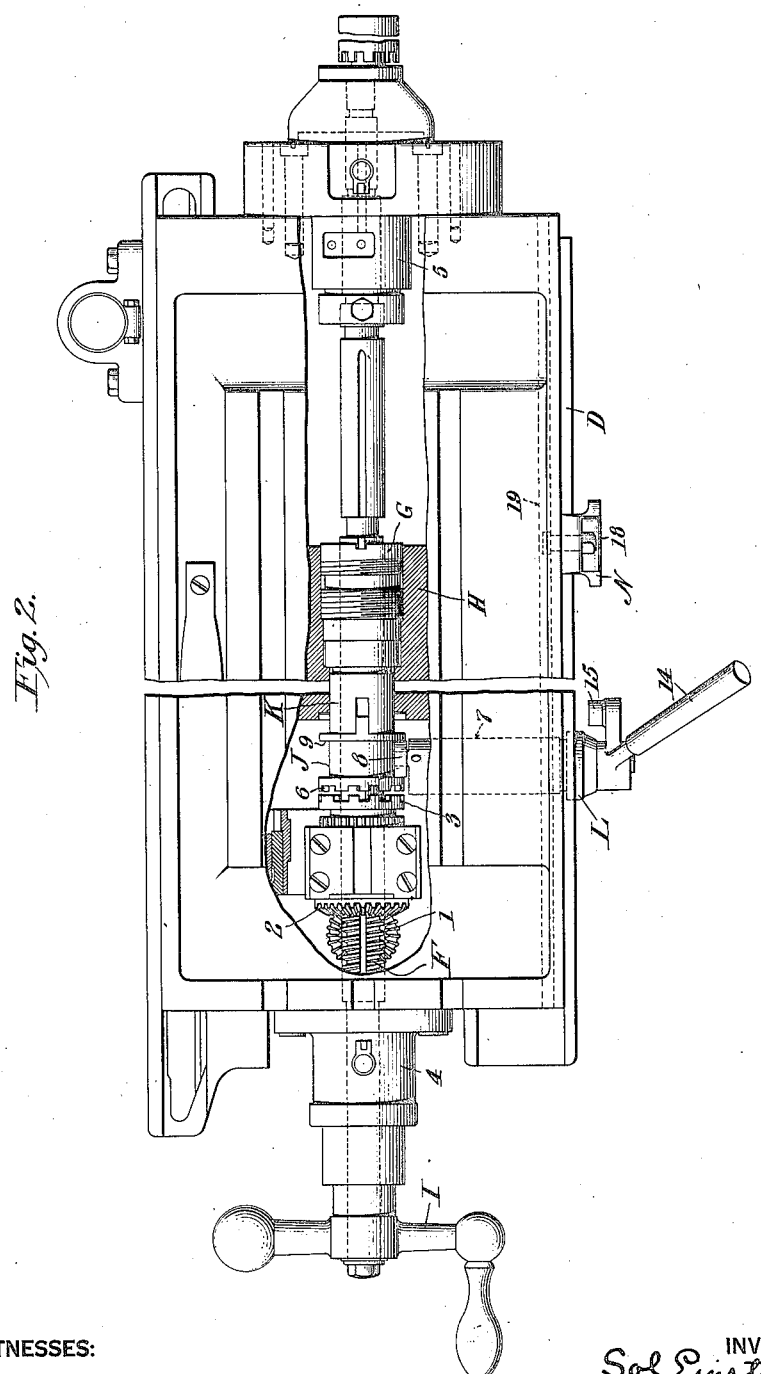

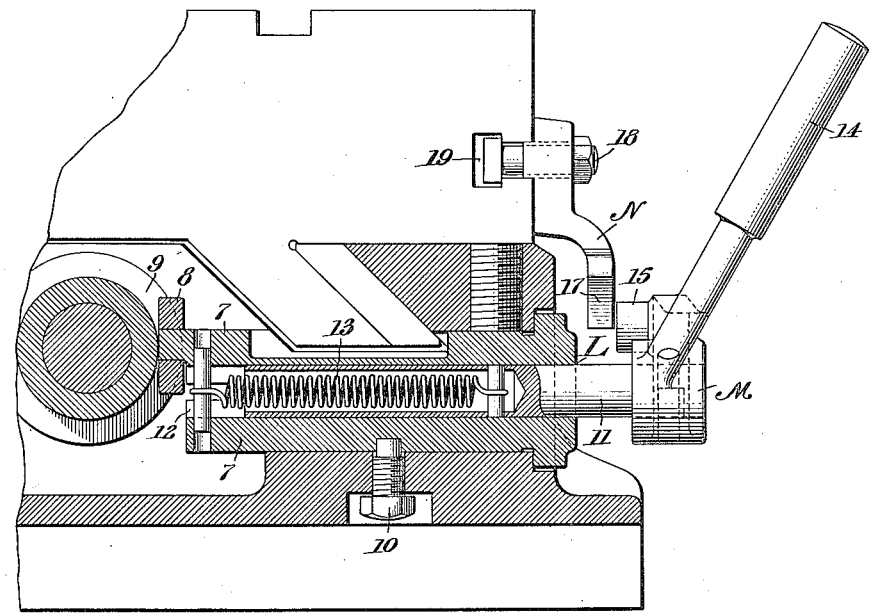
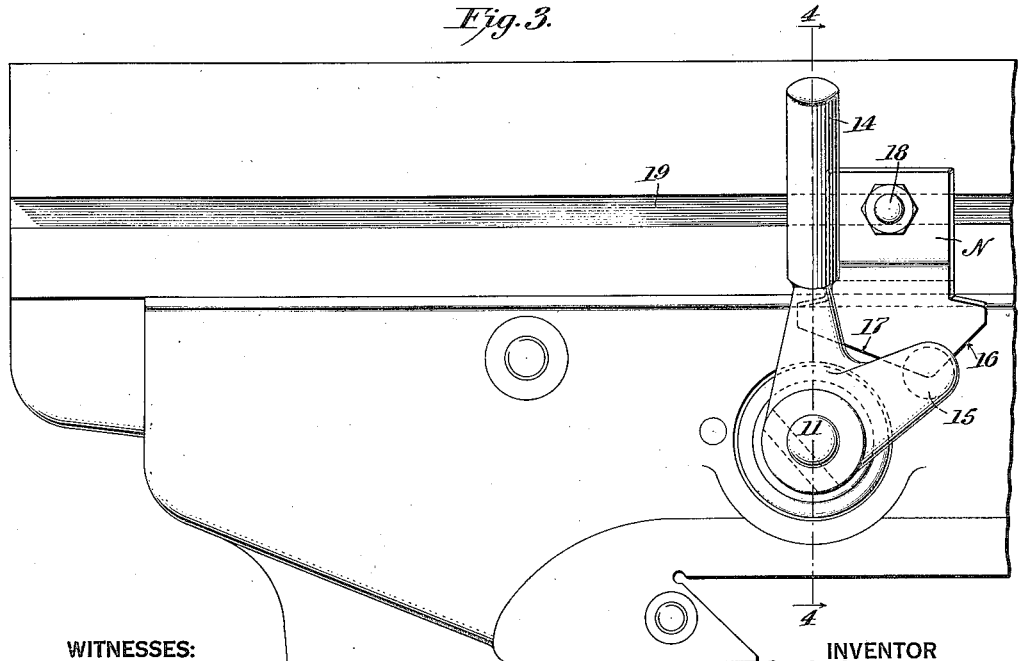

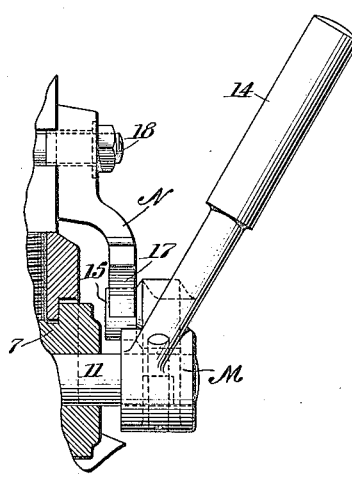
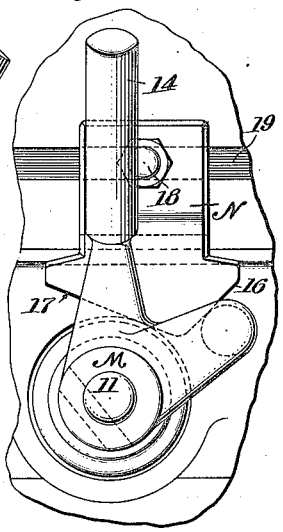
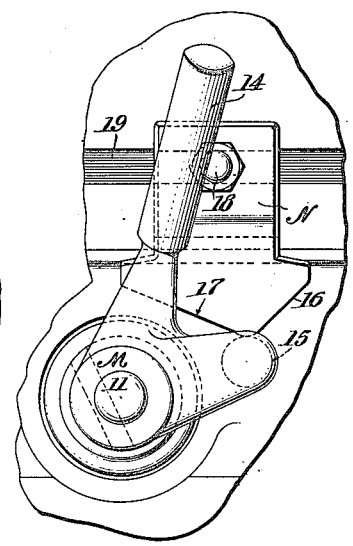
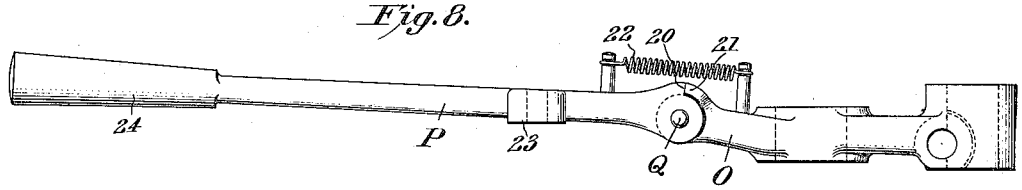
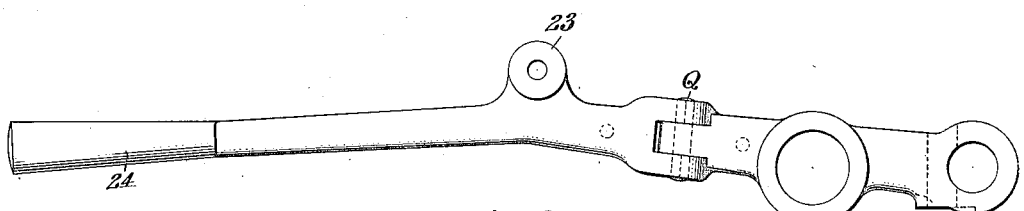

UNITED STATES PATENT OFFICE.

SOL EINSTEIN, OF CINCINNATI, OHIO, ASSIGNOR TO THE CINCINNATI MILLING MACHINE COMPANY, OF CINCINNATI, OHIO, A CORPORATION OF OHIO.

TRIP MECHANISM FOR MACHINE TOOLS.

1,419,117. Specification of Letters Patent. Patented June 6, 1922.

Application filed November 8, 1919. Serial No. 336,667.

*To all whom it may concern:*

Be it known that I, SOL EINSTEIN, a citizen of the United States, and residing at Cincinnati, in the county of Hamilton and State of Ohio, have invented a new and Improved Trip Mechanism for Machine Tools, of which the following specification is a full disclosure.

This invention relates to trip mechanisms for machine tools and it proposes a construction such that the power feed may be immediately re-engaged irrespective of the position of the dog through a manual control after it has been automatically disengaged by a dog.

Machine-tools are habitually provided with automatic trip devices for discontinuing the feed, and the mechanism for achieving this end commonly consists of a so-called trip arranged to be moved, its inoperative position being brought about by a contact with a so-called dog. When the dog has moved the trip into a certain position, a clutch connected with the trip will be moved into such a position that the power is no longer effective to feed the table or other element of the machine. Consequently, further motion must be effected by hand until the dog has completely cleared the trip before the latter can be moved back into its initial position which again connects the clutch with the power and produces a power-driven feed. In certain classes of work, this occasions considerable inconvenience and causes an unnecessary loss of time.

The primary object of this invention is so to construct either the dog or the trip that the disengagement of the power may be automatically effected in the usual manner while also enabling the attendant to effect a disengagement of the contacting dog and trip, and immediately restore the trip to its initial position, irrespective of the dog, and thus enable the power feed to be resumed at the station where it was discontinued in the travel of the table.

Other objects will be in part obvious from the annexed drawings and in part indicated in connection therewith by the following analysis of the invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, of which:—

Fig. 1 is a side elevation of a milling machine embodying this invention. Fig. 2 is a plan of the table. Fig. 3 is a front elevation showing a dog in clearance relation with the trip. Fig. 4 is a section through line 4—4 of Fig. 3, showing the specific construction of the trip. Figs. 5, 6 and 7 show the normal tripping action of this mechanism; and Figs. 8 and 9 show plan and side elevations, respectively, of a trip lever suitable for controlling the cross and vertical feeds of the saddle and knee, respectively.

This invention is shown applied to a milling machine of the species fully revealed in the co-pending application of Robert T. Hazelton, Serial No. 336,664, filed November 8th, 1919, and reference is made thereto for details respecting the organization of the transmission elements, etc. Sufficient of these elements are, however, herein shown to make clear the character and mode of operation of the improved trip mechanism which is the subject of this application.

Referring to Fig. 1, there is shown a milling machine consisting of a column A, a knee B, a saddle C, and a table D. At E is a pulley receiving motion from a suitable power driven belt and this motion is in turn communicated to either the knee, saddle, or table, for the purpose of reciprocating the same in the manner customary with the working elements of machine-tools. In the case of the table, for example, the transmission includes a beveled gear 1 meshing with a beveled gear 2 which is provided with clutch teeth 3. The table D carries a feed screw F which is journaled at its respective ends in bearings 4 and 5 provided by the table. This feed screw passes through a stationary nut G secured to a portion H of the saddle so that when the feed screw is rotated, either manually by means of the handle I, or by motion derived from the power driven gear 2, the table will be reciprocated. In order that the screw may be rotated by power, a clutch member J is splined to a sleeve K which in turn is splined to the screw, so as to permit the clutch J to be shifted to bring its teeth 6 into mesh with the teeth 3 of the gear 2 and complete the mechanical connection employed in propelling the table.

The shifting of the clutch J is effected by means of a trip element L which, in this instance, assumes the form of a rock shaft 7 provided with an eccentrically positioned roller 8 riding in the annular groove 9 of the clutch J. When the trip L is rocked, it will be seen that the clutch will be either engaged or disengaged, as the case may be, and this rocking is effected either by hand or by dog action. The rock shaft 7 is retained against longitudinal movement by means of a screw 10, it being free to rock. The trip L, in addition to the rock shaft 7, comprises also a lateral displaceable part indicated by M. This part, in the form here illustrated, consists of a shaft 11 entering a recess 12 in the rock shaft 7, and splined or keyed in said recess in such a manner that it is capable of longitudinal movement with respect to the rock shaft 7, but has no rotary motion relative to the rock shaft 7. In other words, the part 11 moves as a unit with the trip in directions corresponding to that produced by the dog action, but has an independent movement in so far as permits it to clear its contact with the dog. In this embodiment, this independent movement is in an axial direction and it is yieldingly resisted by means of a spring 13 which normally retains the part M in the path of the dog. For the purpose of manually actuating the trip, it is provided with a hand lever 14 and this lever is utilized both for clearing the part M and for turning the trip to bring the clutch into its operative or its inoperative position.

The power actuation of the trip is effected through the contact of a dog N with a pin or contact portion 15 which normally lies within the path of the dog. The dog is provided with angular wipe surfaces 16 and 17 for contacting and moving the pin 15 and the dog will usually also be adjustably secured to the table or other working element by means of a bolt 18 working in a longitudinal slot 19.

Normally, the parts lie in a plane shown by Fig. 5 and the dog first impacts the pin as shown by Fig. 6 and by the time it has moved it to the position shown by Fig. 7, the power feed will be disconnected. It will be seen that the trip cannot be moved back to its normal position owing to the obstruction of the dog without first swinging or otherwise moving it out of the path of the dog (which this invention provides for), and thereupon the trip can be restored to its initial position and the power feeding can be resumed.

In the modification shown by Figs. 8 and 9, the trip lever is formed of two parts O and P which are hinged together at Q and normally held so that the shoulders 20 and 21 of the hinge are in contact; this being assured by the spring 22. When in this position, the contact surface or roller 23 lies in the path of the dog, but it may be immediately moved to one side by swinging the handle 24, as will be understood. In principle, the construction shown by Figs. 8 and 9 is identical with that shown by Fig. 4, but in a specific sense, has certain advantages over the other, and the one is better adapted for certain local uses than the other.

It will thus be seen that this invention provides a simple solution of a difficulty that has heretofore occasioned the art considerable bother, and that, by this method, a very satisfactory assembled unit is easily and accurately derived.

Without further elaboration, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus revealed this invention, I claim as new and desire to secure by Letters Patent of the United States:

1. A trip mechanism for a machine-tool combining a travelling dog, a trip element actuated thereby, said trip element being rotatable about its axis and being also translatable along said axis and having a single handle adapted to effect said movements; and mechanism for advancing said dog under the control of said trip-element.

2. A trip mechanism for a machine-tool combining a rotatable part; clutch mechanism controlled thereby; a member splined to said part and adapted to be translated relatively thereto, such member having a handle for effecting said translation or for rotating said part; and a travelling dog adapted to effect rotations of said member when in its normal position.

3. A machine-tool combining a saddle; two co-axial elements splined together in telescopic relation, the one element being journalled in the saddle; a table movably mounted on said saddle; a dog adjustably secured to said table; clutch mechanism controlled by said journaled member; the other member being provided with a handle whereby it may be translated and having a contact point normally in the path of said dog, but adapted to be removed therefrom by manipulating said handle.

In witness whereof, I hereunto subscribe my name, as attested by the two subscribing witnesses.

SOL EINSTEIN.

Witnesses:
ROBERT T. HAZLETON,
W. PEASLEE.